United States Patent [19]
Race

[11] 3,993,278
[45] Nov. 23, 1976

[54] LATCH MECHANISM FOR MOUNTING BRACKET ASSEMBLY

[75] Inventor: William James Race, Chicago, Ill.

[73] Assignee: Motorola, Inc., Schaumburg, Ill.

[22] Filed: Mar. 12, 1975

[21] Appl. No.: 557,733

[52] U.S. Cl. .................................. 248/203; 70/58
[51] Int. Cl.² ..................... E05B 73/00; F16B 41/00
[58] Field of Search ............... 70/57, 58, 230, 258; 312/223, 319, 333, 246; 248/203, 318

[56] References Cited
UNITED STATES PATENTS

| | | | |
|---|---|---|---|
| 2,732,240 | 1/1956 | Hutzelman | 312/333 |
| 3,606,112 | 9/1971 | Cheshier | 312/246 UX |
| 3,822,049 | 7/1974 | Saunders | 248/203 |

*Primary Examiner*—Casmir A. Nunberg
*Attorney, Agent, or Firm*—Donald J. Lisa; James W. Gillman

[57] ABSTRACT

A first bracket is adapted to be fixed to a support member such as the underside of a dashboard and a second bracket is adapted to be fixed to an accessory unit, such as a tape player or radio, which is to be mounted to the support member. One bracket slideably receives and supports the other bracket. A bar is slideably mounted transverse the longitudinal axis of one bracket and is biased in one direction such that when the brackets are in the fully mounted position, openings in the side walls of the brackets are aligned and a spring biasing member drives a tab portion on the bar into interlocking engagement within the aligned openings. Electrical quick disconnect means provide power and the other necessary electrical connections. Thumb operated delatch means is provided for quick removal of the accessory unit.

7 Claims, 3 Drawing Figures

U.S. Patent    Nov. 23, 1976    3,993,278
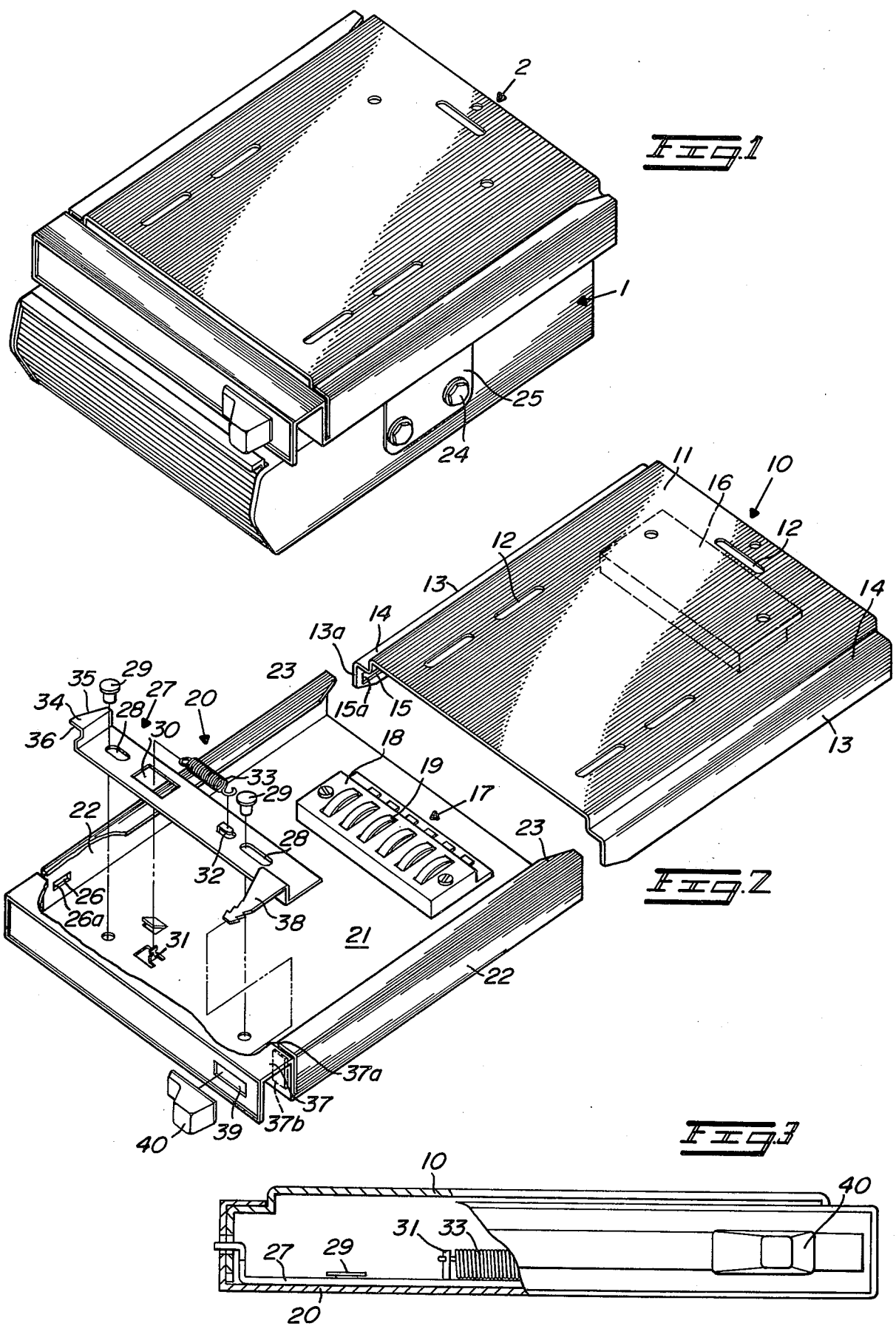

LATCH MECHANISM FOR MOUNTING BRACKET ASSEMBLY

BACKGROUND

1. Field of the Invention

This invention relates generally to a mounting bracket assembly, and in particular to such assemblies where one bracket is slideably received within and supports the other bracket, one of the brackets being provided with a self-operating latch mechanism.

2. Prior Art

A large market exists for bracket assemblies which are adapted to mount electrically powered accessory units to a support member. For example, automotive, marine entertainment and two-way communications for mobile units. One such market is the automotive entertainment aftermarket. Vehicle owners require a removable bracket assembly for mounting accessories such as tape players, radios, speakers and the like to a support such as the underside of a dashboard or the fire wall. Frequently it is convenient, where one operator uses multiple vehicles to remove the accessory unit from one permanently mounted bracket support in one vehicle and transfer the unit to another permanently mounted bracket in the other vehicle.

A variety of bracket assemblies is known for fulfilling these functions. Theft of these accessories has been a major problem and a variety of techniques is also known for providing means to lock the bracket assemblies together, such as the anti-theft bracket device of U.S. Pat. No. 3,822,049, or for locking the bracket and unit directly to the support member, such as the locking device of U.S. Pat. No. 3,766,759. In either of the above patents, the accessory units are removable from their mounting position but, to do so, the operator must first unlock the locking mechanism with a key. This provides an annoyance or inconvenience to the owner who frequently chooses to leave the locked unit intact in the automobile. Thus, thieves continue to try to enter the automobile and defeat the locks. This frequently results in damage to the automobile and/or to the accessory unit.

Another way to solve the theft problem is to design the brackets so that they are easily disengaged so that the accessory unit can be removed by the owner when he leaves the automobile. In such cases the unit can be locked safely either in the glove compartment or in the trunk, one half of the mounting bracket being left in the automobile in an inconspicuous place so that a thief is not enticed to forcibly enter the vehicle and damage any portion of it while searching for the unit. One known quickly detachable mounting bracket assembly provides an upper U-shaped bracket fixed to the underside of the dashboard slideably receiving and supporting a bottom U-shaped bracket fixed to the accessory. The upper bracket has a pair of spring biased roller means mounted at its side edges which snap into slots in the side portions of the bottom bracket when the brackets are in the fully assembled relation. Such an assembly, while easily removable by the operator, suffers from the same disadvantage of the anti-theft devices discussed above when such devices are left in an unlocked condition for easy removal, namely, the accessory units become body-injuring-missiles under the slightest rear end impact which causes the selfoperating latches to release.

SUMMARY OF THE INVENTION

Accordingly, it is an object of the present invention to provide a self-locking, positive latching bracket assembly which requires little force for operation, is quickly detachable and can withstand large rear end impact forces without unlatching.

Briefly, the invention includes a first bracket member adapted to be fixed to the support member, a second bracket member adapted to be fixed to the accessory unit, means for slideably supporting one of the first and second brackets upon the other for mounting the accessory to the support unit, electrical interconnection means adapted for interconnection when the first and second brackets are in their fully mounted relation for providing electrical power to the accessory and means for removably interlocking the first and second brackets comprising a bar mounted to one of the first and second brackets and slideable between a first and second position, a spring biasing means which urges the bar to the first position and a latch means fixedly mounted in the other bracket whereby the bar engages the latch under the action of the biasing means thereby fixedly interlocking the brackets when the brackets are in their fully mounted relation. Means is provided for moving the bar to the second position for disengaging the latch mechanism to remove the accessory when desired.

The foregoing and other aspects of the present invention will be understood more fully from the following detailed description of an illustrative embodiment of the present invention in conjunction with the accompanying drawings.

DETAILED DESCRIPTION OF THE DRAWINGS

FIG. 1 is a perspective view of the accessory unit attached to the bracket assembly of the present invention and adapted for connection to the underside of a dashboard (not shown).

FIG. 2 is an exploded perspective of the bracket assembly of the present invention.

FIG. 3 is a front elevation in partial section of the bracket assembly in the fully inserted position showing the bar in the latched position.

DETAILED DESCRIPTION OF THE PREFERRED EMBODIMENTS

Referring now to the drawings in detail and using the same reference character to identify the same or similar parts in all the drawings there is shown in FIG. 1 an accessory unit 1 mounted to the bracket assembly 2 of the present invention adapted for connection to the underside of a dashboard (not shown).

Shown in FIG. 2 the bracket assembly includes an upper bracket 10 which is generally U-shaped having a central connecting portion 11 adapted by holes 12 to be mounted by screws (not shown) or other known means to the underside of the dashboard, tne integral depending flange portions 13 which form the side members of the U-shaped bracket. Each depending flange portion 13 is formed with a notched channel 14 extending the length of the bracket for receiving and supporting the lower bracket 20 as more fully described below. One of the depending flanges 13 is formed with a slotted opening 15 which forms one portion of the latch means of the latch mechanism. One half of an electrical interconnection means 26 is mounted on the underside of the upper bracket and is a matching duplicate of the other half of the electrical interconnect 17 mounted on the lower bracket. The two halves of the electrical interconnect are designed to cooperate and make contact with each other when the two brackets are in the fully mounted relation. The electrical interconnect 17 includes a terminal support 18 mounted to the lower bracket 20 supporting a plurality of spring wiper terminals 19 each one forming a terminal for an electrical circuit within the accessory unit. Corresponding spring wipers are mounted in a support in electrical interconnect 16. Each wiper contact of interconnect 16 is electrically coupled (not shown) to a wire which is then electrically coupled to appropriate circuits in the automobile to complete all electrical and power connections between the accessory and the vehicle. Contacts 19 of the two interconnects are simply brought into contact with each other when the brackets are fully assembled thereby completing the electrical connection between the accessory and automobile.

The lower bracket 20 is also a U-shaped bracket having a central connecting portion 21 and two upstanding integral side wall portions 22 affixed thereto. Each side wall portion 22 has its upper end turned inwardly to form a flange 23 which receives and is supported on the notched channels 14 of the upper bracket 10. The lower bracket 20 is affixed to the accessory 1 by any known means such as screws 24 and depending bracket portion 25 shown in FIG. 1. The upstanding side wall 22 adjacent the depending flange 13 having the slotted opening 15 is also formed with a slotted opening 26 for alignment with the slotted opening 15 when the two brackets are in the fully assembled relation.

Lower bracket 20 is further formed with a slide bar 27 having slots 28. Rivets 29, or other known mounting means, mount the slide bar 27 to the upper bracket 20 for slideable movement transverse the longitudinal axis of the bracket 20 in a plane which is in alignment with the opening 26 and the opening 15 when the brackets are fully assembled. Bar 27 also has slot 30 for receiving tab 31. Bar 27 includes a tab 32. Spring 33 is a biasing means having its ends secured to tabs 31 and 32 and biases bar 27 leftward to a first position. Slide bar 27 has a further tab 34 which serves as part of the latch mechanism. Latch tab 34 has a cam face 35.

In operation, when bracket member 20 is moved into mounting relation on bracket 10 the leading edge 13a of depending flange 13 comes into engagement with cam edge 35 biasing bar 27 to the right or second position against the action of spring 33 until bracket 20 is in the fully inserted position whereupon holes 15, 26 are aligned with tab 34 which is then moved to the left under the action of the bias spring 33. The front edge 36 of tab 34 extends through the holes 15, 26 and in tight frictional engagement with the vertical forward edge 15a, 26a of the slotted openings.

Bracket 20 is further formed with a front U-shaped portion 37 inside wall surface 37a of which abuts against the front edge 13a and functions as a stop shoulder defining the fully mounted position for the bracket assembly. Optionally, the inside rear wall surface 37a of portion 37 which is contacted by the front edge 13a may be equipped with a resilient pad 37b, shown in dotted lines in FIG. 2, which is compressed when the lower bracket is in the fully mounted position permitting a tight frictional fit between front edge 36 of tab 34 and the vertical front edges 15a, 26a preventing rattles.

Finally, slide bar 27 is further formed with a tab 38 which extends forwardly through openings 39 in the front wall 37. Tab 38 receives button 40 thus providing a means for moving the bar manually rightward to the second position against the action of the biasing spring with one hand for disengaging the bar 27 from the latched position to remove the accessory when desired. The U-shaped portion 37 forms a convenient handle into which the operator's fingers are placed while using the thumb to operate the delatch button 40 for removing the accessory unit.

What has been described is thus a self-locking, easily removable, bracket assembly which provides a positive lock in the assembled position preventing the accessory unit from being inadvertently withdrawn as the result of a rear end collision. Yet, on the other hand, a simple one-hand operation by moving the button rightward to disengage the lock mechanism provides a means for quickly removing the accessory upon the operator leaving the automobile so that it can be locked in a safe compartment of the vehicle or taken with the operator.

Various other modifications and changes may be made to the present invention from the principles of the invention described above without departing from the spirit and scope thereof as encompassed in the accompanying claims.

I claim:
1. Bracket assembly for removably attaching an electrically powered accessory to a support member comprising
   a first bracket member adapted to be fixed to the support member,
   a second bracket member adapted to be fixed to the accessory,
   means for slidably supporting one of the first and second brackets upon the other of the brackets for mounting the accessory to the support member,
   means for removably interlocking the first and second bracket members, and
   electrical interconnection means adapted for interconnection when the first and second bracket members are interlocked for providing electrical power to the accessory
   wherein the improvement comprises
   a bar mounted to one of the first and second brackets and slidable between first and second positions,
   biasing means urging the bar to the first position,
   a latch including an opening in the other of the first and second brackets,
   the bar having a tab portion extending laterally therefrom, the tab having a cammed edge for cooperation with a fixed portion of the other of the first and second brackets which forces the bar to the second position against the action of the biasing means as the one of the first and second brackets is moved into mounting relation on the other of said brackets, the biasing means moving the bar to the first position fixedly interlocking the brackets when said brackets reach a fully mounted relation, and
   means for moving the bar to the second position for disengaging the bar from the latch to remove the accessory when desired.
2. The bracket assembly as claimed in claim 1 wherein the first bracket is the upper bracket and is U-shaped having the central portion adapted for connection to the support member, the side portions of the bracket forming integral flanges depending from the connecting portion, the side portions each formed with a notch extending the length thereof providing a support channel for the lower bracket, a first opening in one of the depending flanges, the second bracket is the lower bracket and is U-shaped having the central portion adapted for connection to the accessory, the side portions forming integral upstanding side walls, each side wall having an inturned flange portion, the lower bracket dimensioned for slideably receiving the depending flanges of the upper bracket, the inturned flanges of the lower bracket being received in the notched channels of the upper bracket and supported thereon, and a second opening in one of the side walls of the lower bracket, the first and second openings being in alignment when the upper and lower brackets are in a fully mounted relation.

3. The bracket assembly as claimed in claim 1 wherein the disengaging means comprises a tab on the bar extending forwardly and adapted for receipt of a button, and a button mounted on the second tab.

4. The bracket assembly as claimed in claim 3 wherein the first bracket is the upper bracket, the second bracket is the lower bracket, further comprising the upper bracket having a forward edge, a wall portion on the lower bracket extending transversely thereof forming a shoulder for abutment against the forward edge of the upper bracket to limit movement of the lower bracket relative to the upper bracket, the latch including first and second openings in the brackets, the openings being aligned when the shoulder is abutting the forward edge, the bar mounted to the lower bracket, the laterally extending tab of the bar extending through the first and second openings locking the upper and lower brackets together, an opening in the transverse wall, and the forwardly extending disengaging tab extending through the opening.

5. The bracket assembly as claimed in claim 6 wherein the biasing means is a spring having one end connected to the bar and the other end connected to a tab on the lower bracket, the bar having a slotted opening therein, and the latter tab extending through the slotted opening of the bar.

6. Bracket assembly for removably attaching an electrically powered accessory to a support member comprising a first upper bracket member adapted to be fixed to the support member and having a forward edge, a second lower bracket member adapted to be fixed to the accessory and having a wall portion extending transversely thereof forming a shoulder for abutment against the forward edge of the upper bracket to limit movement of the lower bracket relative to the upper bracket, an opening in the transverse wall, means for slidably supporting one of the first and second brackets upon the other of the brackets for mounting the accessory to the support member, means for removably interlocking the first and second bracket members, electrical interconnection means adapted for interconnection when the first and second bracket members are interlocked for providing electrical power to the accessory, a bar mounted on the lower bracket and slidable between first and second positions, biasing means urging the bar to the first position, a latch including at least one opening in the upper bracket, the bar mounted on the lower bracket and having a laterally extending tab portion with a cammed edge formed for cooperation with a fixed portion of the upper bracket which forces the latch to the second position against the action of the biasing means as the bottom bracket is moved into mounting relation upon the upper bracket, the biasing means moving the bar to the first position so that the tab portion extends through the latch opening to fixedly interlock the brackets when the lower bracket is supported upon the upper bracket in a fully mounted relation, and tab means extending forwardly through the transverse wall opening for moving the bar to the second position for disengaging the bar from the latch to remove the accessory when desired.

7. Bracket assembly for removably attaching an electrically powered accessory to a support member comprising a first upper bracket member adapted to be fixed to the support member and having a forward edge, a second lower bracket member adapted to be fixed to the accessory and having a wall portion extending transversely thereof forming a shoulder for abutment against the forward edge of the upper bracket to limit movement of the lower bracket relative to the upper bracket, an opening in the transverse wall, means for slidably supporting one of the first and second brackets upon the other of the brackets for mounting the accessory to the support member, means for removably interlocking the first and second bracket members, electrical interconnection means adapted for interconnection when the first and second bracket members are interlocked for providing electrical power to the accessory, a bar mounted to one of the first and second brackets and slidable between first and second positions, biasing means urging the bar to the first position, a latch including at least one opening in the other of the first and second brackets, the bar having a laterally extending tab portion extending through the latch opening under the action of the biasing means fixedly interlocking the brackets when one of the brackets is supported upon the other in a fully mounted relation, a resilient lining on the shoulder which is compressed by the forward edge of the upper bracket, the laterally extending tab of the bar being held in tight frictional engagement with the other bracket adjacent the latch opening, and tab means extending forwardly through the transverse wall opening for moving the bar to the second position for disengaging the bar from the latch to remove the accessory when desired.

* * * * *